United States Patent
Fujii et al.

(10) Patent No.: US 7,590,200 B2
(45) Date of Patent: Sep. 15, 2009

(54) RECEIVER, A TRANSMITTER, A RADIO COMMUNICATION SYSTEM AND A CHANNEL ESTIMATION METHOD

(75) Inventors: Hiromasa Fujii, Yokosuka (JP); Jiyun Shen, Yokohama (JP); Takahiro Asai, Yokosuka (JP); Hirohito Suda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 647 days.

(21) Appl. No.: 11/106,433

(22) Filed: Apr. 15, 2005

(65) Prior Publication Data

US 2005/0276360 A1    Dec. 15, 2005

(30) Foreign Application Priority Data

Apr. 16, 2004    (JP)    .............. 2004-122163

(51) Int. Cl.
*H04B 7/10*    (2006.01)
(52) U.S. Cl. .................. 375/347; 375/148; 375/340
(58) Field of Classification Search .................. 375/260
See application file for complete search history.

(56) References Cited

U.S. PATENT DOCUMENTS

| 5,303,263 | A * | 4/1994 | Shoji et al. ................. | 375/229 |
| 5,537,443 | A * | 7/1996 | Yoshino et al. ............. | 375/340 |
| 6,535,502 | B1 * | 3/2003 | Brink .......................... | 370/345 |
| 2002/0160814 | A1 * | 10/2002 | Miya .......................... | 455/562 |
| 2002/0161560 | A1 * | 10/2002 | Abe et al. ................... | 702/196 |
| 2003/0174767 | A1 * | 9/2003 | Fujii et al. .................. | 375/229 |
| 2004/0062302 | A1 * | 4/2004 | Fujii et al. .................. | 375/232 |
| 2004/0091057 | A1 * | 5/2004 | Yoshida ...................... | 375/260 |

FOREIGN PATENT DOCUMENTS

JP    2003-152603    5/2003

OTHER PUBLICATIONS

Hiromasa Fujii, et al., "Turbo receiver with SC/Simplified-MMSE (S-MMSE) type equalizer for MIMO channel signal transmission", IEEE vtc 2003-Fall, pp. 632-636.

* cited by examiner

*Primary Examiner*—David C Payne
*Assistant Examiner*—Leon Flores
(74) *Attorney, Agent, or Firm*—Oblon, Spivak, McClelland, Maier & Neustadt, L.L.P.

(57) ABSTRACT

A radio communication system including a transmitter and a receiver (100) for transmitting MIMO channel signals is provided. The transmitter comprises a pilot signal insertion controller (93) for inserting a pilot signal for channel estimation into at least a leading frame; and an information symbol controller for controlling the number of information symbols to be contained in a frame, based on the existence of the pilot signal. The receiver comprises a received signal replica generator (112) for generating received signal replicas based on previously obtained provisional channel estimation values and transmission signal estimation values; a canceller (111) for removing, from a received signal, received signal replicas of at least a part of streams that are not channel estimation target streams; and a channel estimation value generator (113) for generating channel estimation values by a filter using outputs from the removing unit and the transmission signal estimation values.

6 Claims, 14 Drawing Sheets

■ PILOT SIGNAL

☐ DATA SIGNAL

▨ DATA SIGNAL USED FOR CHANNEL ESTIMATION

■ PILOT SIGNAL

☐ DATA SIGNAL

▨ DATA SIGNAL USED FOR CHANNEL ESTIMATION

RECEIVER, A TRANSMITTER, A RADIO COMMUNICATION SYSTEM AND A CHANNEL ESTIMATION METHOD

BACKGROUND OF THE INVENTION

The present invention generally relates to a receiver, a transmitter and a radio communication system, and a channel estimation method for a MIMO (Multiple Input Multiple Output) system in which both the receiver and the transmitter are provided with a plurality of antennas.

In conventional mobile communication systems, channel estimation generally has been performed using pilot signals, and channel compensation and equalization have been employed for detecting information symbols. In order to increase the channel estimation accuracy, more pilot signals are required. However, if more pilot signals are employed in frames, the actual transmittable information in frames becomes less. As a solution to this problem, an iterative channel estimation method is known, in which detected information bits are utilized for estimating channels.

A receiver performing such an iterative channel estimation is explained with reference to FIG. 1.

A receiver 10 performing such an iterative channel estimation comprises a plurality (M) of antennas 1, a plurality of channel estimators 2 (2-1~2-M) and a plurality of channel updating (or renewing) units 4 (4-1~4-M) connected to the antennas 1, an information signal detector 3 connected to the antennas 1, a transmission symbol 's' generator 9 receiving an output from the information signal detector and connected to the channel updating unit 4 (4-1~4-M), and a controller 5 connected to the information signal detector 3 and 's' generator 9. The information signal detector 3 is switch-ably connected to the channel estimators 2 (2-1~2-M) or the channel updating units 4 (4-1~4-M) via a switch 6. Each of the channel estimators 2 (2-1~2-M) receives a pilot signal.

In operation, the antennas 1 receive signals and supply the received signals to the corresponding channel estimators 2 (2-1~2-M). Each of the channel estimators 2 uses the received signal and pilot signals included therein to estimate channels, and inputs the channel estimation value to the information signal detector 3.

The information signal detector 3 uses the input channel estimation values and the received signals to detect information signals. The detected information signal such as information bits are output and supplied to the 's' generator 9 also. The 's' generator 9 uses the input information bits and performs a process the same as in the transmitter to generate estimated transmit symbols.

The estimated transmit symbols are input to each channel updating unit 4 (4-1~4-M). Each channel updating unit 4 (4-1~4-M) uses the input estimated transmit symbols instead of pilot signals to estimate channels. The channel estimators 2 (2-1~2-M), the information signal detector 3, the channel updating units 4 (4-1~4-M) and the 's' generator 9 are controlled by the controller 5.

In this manner, channel estimation can be done using many received signals, and therefore the channel estimation accuracy can be improved. The channel estimation values can be used for detecting information in the information signal detector 3, and therefore more highly accurate detection is obtained.

On the other hand, there exists a MIMO channel signal transmission system that can realize high frequency usage efficiency. In the MIMO channel signal transmission system, both transmitter and receiver use a plurality of antennas and have a plurality of channels between the transmitter and receiver to obtain parallel transmission and diversity advantages. One problem with this MIMO channel signal transmission system is that there are many channels to be estimated and therefore many pilot signals are required.

A scheme of combining the MIMO channel signal transmission system and the iterative channel estimation system is known as shown in Japanese Patent Laid-Open Application No. 2003-152603. A receiver according to this scheme is explained with reference to FIG. 2, in which a transmitter simultaneously sends N different information data streams over the same frequency.

The receiver 10 comprises M antennas 1, a plurality of channel estimators 2 (2-1~2-M) connected to the corresponding antennas 1, a receiving unit 7 connected to the antennas 1, and $s_1$ generator 8-1~$s_N$ generator 8-N connected to the corresponding channel estimators 2 (2-1~2-M).

The receiver 10 have M channel estimators 30 for M antennas and each of the M channel estimators has to estimate N values for N transmission streams.

The channel estimators 2 (2-1~2-M) use received data and pilot signals included in the received signals, estimate channels and input the channel estimation values to the receiving unit 7.

The receiving unit 7 uses the input channel estimation values and the received signals, detects information signals, and outputs the detected information signals such as information bits (st1, . . . , stN). The receiving unit 7 supplies the information bits (st1, . . . , stN) to the $s_1$ generator 8-1, . . . , the $s_N$ generator 8-N.

Each of the $s_1$ generator 8-1, . . . , the $s_N$ generator 8-N generates an estimated transmit symbol $s_1$, . . . , $s_N$ from the input information bits, and inputs the generated estimated transmit symbols $s_1$, . . . , sN to the corresponding channel estimator 2-1, . . . , 2-M.

The channel estimators 2-1, . . . , 2-M use the input estimated transmit symbols instead of the pilot signals to update (or renew) channel estimates. The channel estimators 2-1~2-M, the receiving unit 7 and s generator 8-1~the $s_N$ generator 8-N are controlled by a controller (not shown).

The structure of the channel estimator 2-1 in the receiver 10 is explained with reference to FIG. 3. Other channels estimators 2-2~2-M are the same as the channel estimator 2-1 and therefore their explanations are omitted.

The channel estimator 2-1 comprises a channel estimator 2-11 receiving the received signal r1(t) and the pilot signal, a channel updating (or renewing) unit 2-12 connected to the channel estimator 2-11 and receiving the received signal r1(t) and the estimated transmit symbols ($s_1$, . . . , $s_N$), and a multiplexer 2-15 switchably connected to the channel estimator 2-11 or the channel updating unit 2-12 via switches 2-13. The channel estimator 2-1 further comprises a controller 2-14 connected to the channel estimator 2-11, the channel updating unit 2-12 and the switches 2-13.

In operation, the channel estimator 2-11 uses the received signal r1(t) and the pilot signal to estimate channels. Regarding the pilot signal, channel estimation can be comparatively easily done by making the pilot signals orthogonal among the streams. For example, it is possible to use a frame structure and channel estimation method disclosed in the following document.

"Turbo receiver with sc/simplified-MMSE (S-MMSE) type equalizer for MIMO channel signal transmission", H. Fujii et. al., IEEE vtc 2003-Fall On the other hand, during the data period, the received signals include a plurality of stream signals having no orthogonal relations. Then it is required to suppress interference between streams and estimate each channel.

The initial channel estimation values (h11, . . . , H1N) estimated in the channel estimator 2-11 are input to the channel updating unit 2-12 and the multiplexer 2-15 via the switch 2-13.

The multiplexer 2-15 multiplexes the input initial channel estimators and outputs.

The channel updating unit 2-12, based on the input initial channel estimation values and estimated transmit symbols $(s_1, \ldots, s_N)$, estimates channels, and supplies the channels estimation values to the multiplexer 2-15. The multiplexer 2-15 multiplexes the input channel estimation values and outputs.

The structure of the channel updating unit 2-12 is explained with reference to FIG. 4.

The channel updating unit 2-12 comprises a correlation vector calculator 2-121 receiving the received signals r1(t) and the estimated transmit symbols $s_1(t) \sim s_N(t)$, a correlation matrix calculator 2-122 receiving the estimated transmit symbols $s_1(t) \sim s_N(t)$, and a multiplier 2-123 connected to the correlation vector calculator 2-121 and the correlation matrix calculator 2-122.

The channel from the transmit antenna n to the receiving antenna m is represented by hmn, and the vector Hm is represented by $Hm=[hm1\ hm2\ \ldots\ hmN]^T$, the estimated transmit symbol is represented by $s_n(t)$, that is the vector S(t) is represented by $S(t)=[(s_1(t)\ s_2(t) \ldots s_N(t)]^T$, and the received signal is represented by rm(t).

The correlation vector calculator 2-121 calculates a correlation vector Rxd by an equation $Rxd=\Sigma(rm^*(t)S(t))/Nsmp$, where Nsmp means the number of received signals used for the channel estimation.

The correlation matrix calculator 2-122 calculates a correlation matrix Rxx by an equation $Rxx=\Sigma(S(t)S(t)^H)/Nsmp$, where H means conjugated transpose.

The correlation vector Rxd calculated by the correlation vector calculator 2-121 and the correlation matrix Rxx calculated by the correlation matrix calculator 2-122 are input to the multiplier 2-123. The multiplier 2-123 obtains the channel Hn by an equation $Hm=Rxx^{-1}Rxd$.

However, the above explained related art examples have the following problems.

In the channel estimation method using MMSE (Minimum Mean Square Error), it is required to use the degree of freedom of the filter to suppress other streams, and therefore channel estimation accuracy is degraded especially when the number of the received signals is few.

When using the MMSE, it is required to obtain an inverse matrix of training signals, and therefore the amount of calculations becomes large. Even if a RLS (Recursive Least Square) algorithm is used to converge the channel estimation values, the amount of calculations is still large.

[Patent Document #1]
  Japanese Laid-open 2003-152603
[Patent Document #2]
  "Turbo receiver with SC/Simplified-MMSE (S-MMSE) type equalizer for MIMO channel signal transmission", H. Fujii et. al, IEEE VTC2003-Fall

SUMMARY OF THE INVENTION

A general object of the present invention is to provide a receiver, a transmitter, a radio communication system and a channel estimation method which can improve channel estimation accuracy while reducing the amount of calculation.

The above object of the present invention is achieved by a receiver (100) in a radio communication system transmitting MIMO channel signals, comprising a received signal replica generator (112) for generating received signal replicas based on previously obtained provisional channel estimation values and transmission signal estimation values; a canceller (111) for removing, from a received signal, received signal replicas of at least a part of streams that are not a channel estimation target stream; and a channel estimation value generator (113) for generating channel estimation values by determining a filter coefficient per stream based on outputs from the removing unit and the transmission signal estimation values.

In the receiver, the channel estimation value generator (113) may determine filter coefficients so as to reduce interference from streams that have not cancelled in the canceller (111).

In the receiver, the channel estimation value generator (113) may input the generated channel estimation values to the received signal replica generator as provisional channel estimation values.

The receiver may further comprise a blocking unit (117) for dividing a frame into plural blocks; an equalizing unit for separating the received signal to each stream; the channel estimation value generator obtaining a channel estimation value per block; the equalizing unit, based on the channel estimation value obtained per block, separating the received signal to each stream.

In the receiver, the channel estimation value generator (113) may determine a size of the block based on channel variation speed.

In the receiver, the received signal replica generator (112) may generate received signal replicas based on at least a part of transmission signal estimation values; and the canceller (111) may remove, from at least a part of received signals, received signal replicas of at least a part of streams that are not a channel estimation target stream.

According to another feature of the present invention, a transmitter (50) in a radio communication system transmitting MIMO channel signals comprises a pilot signal insertion controller (93) for inserting a pilot signal for channel estimation into at least a leading frame; and an information symbol controller for controlling the number of information symbols to be contained in a frame, based on the existence of the pilot signal.

According to another feature of the present invention, a radio communication system including a transmitter and a receiver (100) for transmitting MIMO channel signals is provided. The transmitter comprises a pilot signal insertion controller (93) for inserting a pilot signal for channel estimation into at least a leading frame; and an information symbol controller for controlling the number of information symbols to be contained in a frame, based on the existence of the pilot signal. The receiver comprises a received signal replica generator (112) for generating received signal replicas based on previously obtained provisional channel estimation values and transmission signal estimation values; a canceller (111) for removing, from a received signal, received signal replicas of at least a part of streams that are not a channel estimation target stream; and a channel estimation value generator (113) for generating channel estimation values by determining a filter coefficient per stream based on outputs from the removing unit and the transmission signal estimation values.

According to another feature of the present invention, a channel estimation method in a receiver in a radio communication system transmitting MIMO channel signals is provided. The method comprises the steps of generating received signal replicas based on previously obtained provisional channel estimation values and transmission signal estimation values; removing, from a received signal, received signal replicas of at least a part of streams that are not a channel estimation target stream; determining a filter coefficient per stream, based on the transmission signal estimation values; and generating a channel estimation value per stream, based on the signal from which the received signal replicas have been removed.

DESCRIPTION OF THE PREFERRED EMBODIMENTS

Figure 1:
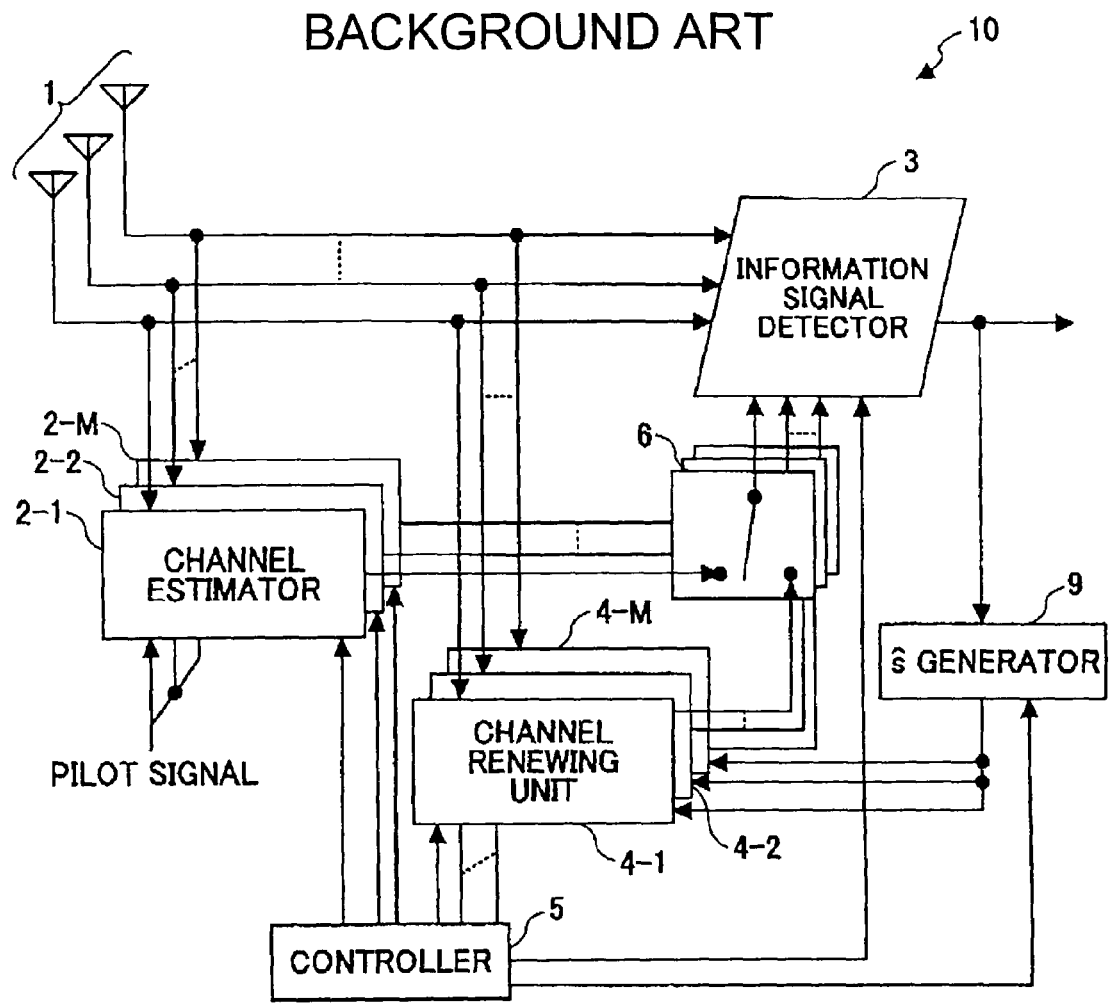
FIG. 1 schematically shows a block diagram of a receiver which performs iterative channel estimation.
Figure 2:
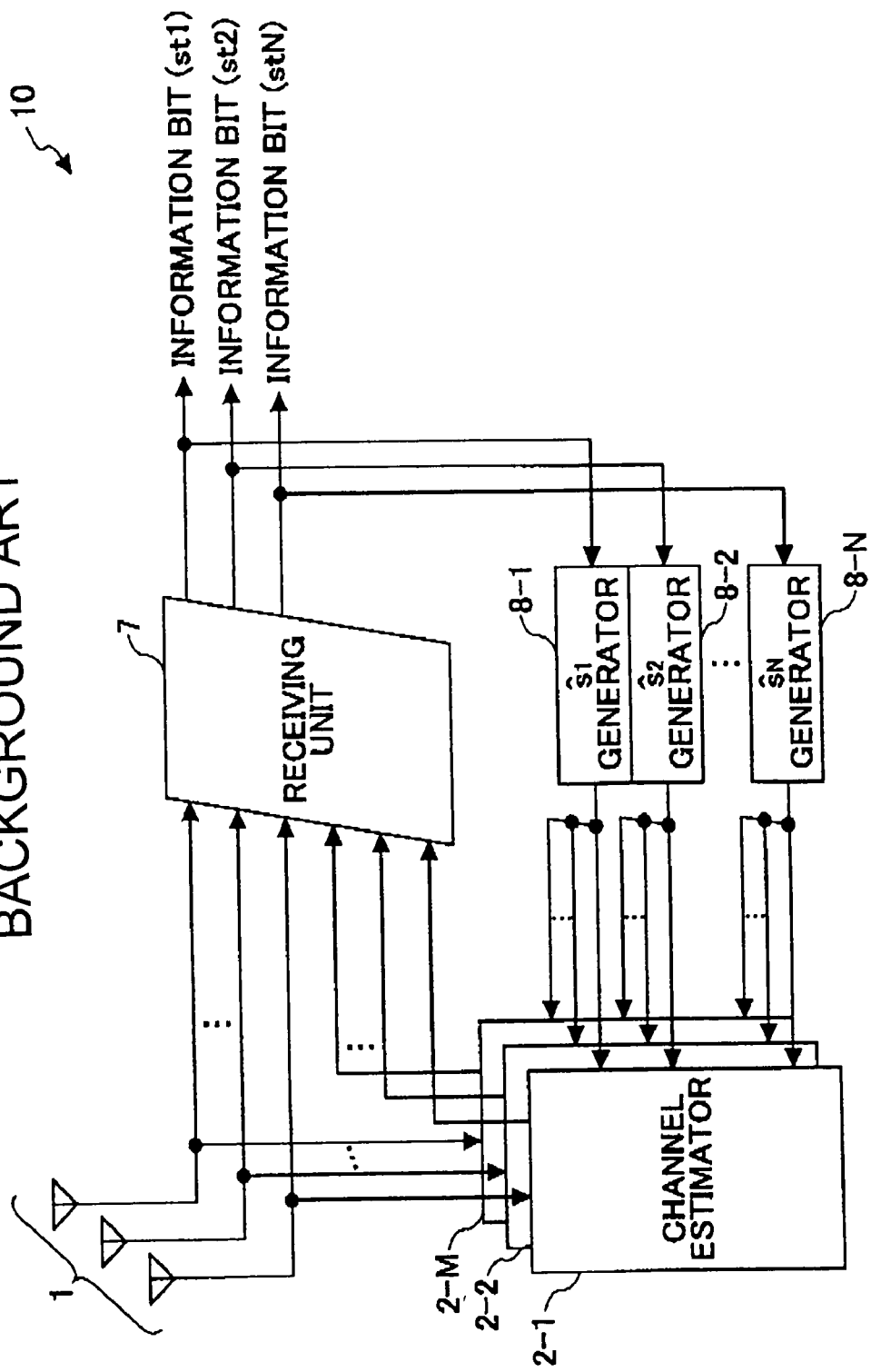
FIG. 2 schematically shows a block diagram of a receiver in which the iterative channel estimation is applied to MIMO channel transmission system.
Figure 3:
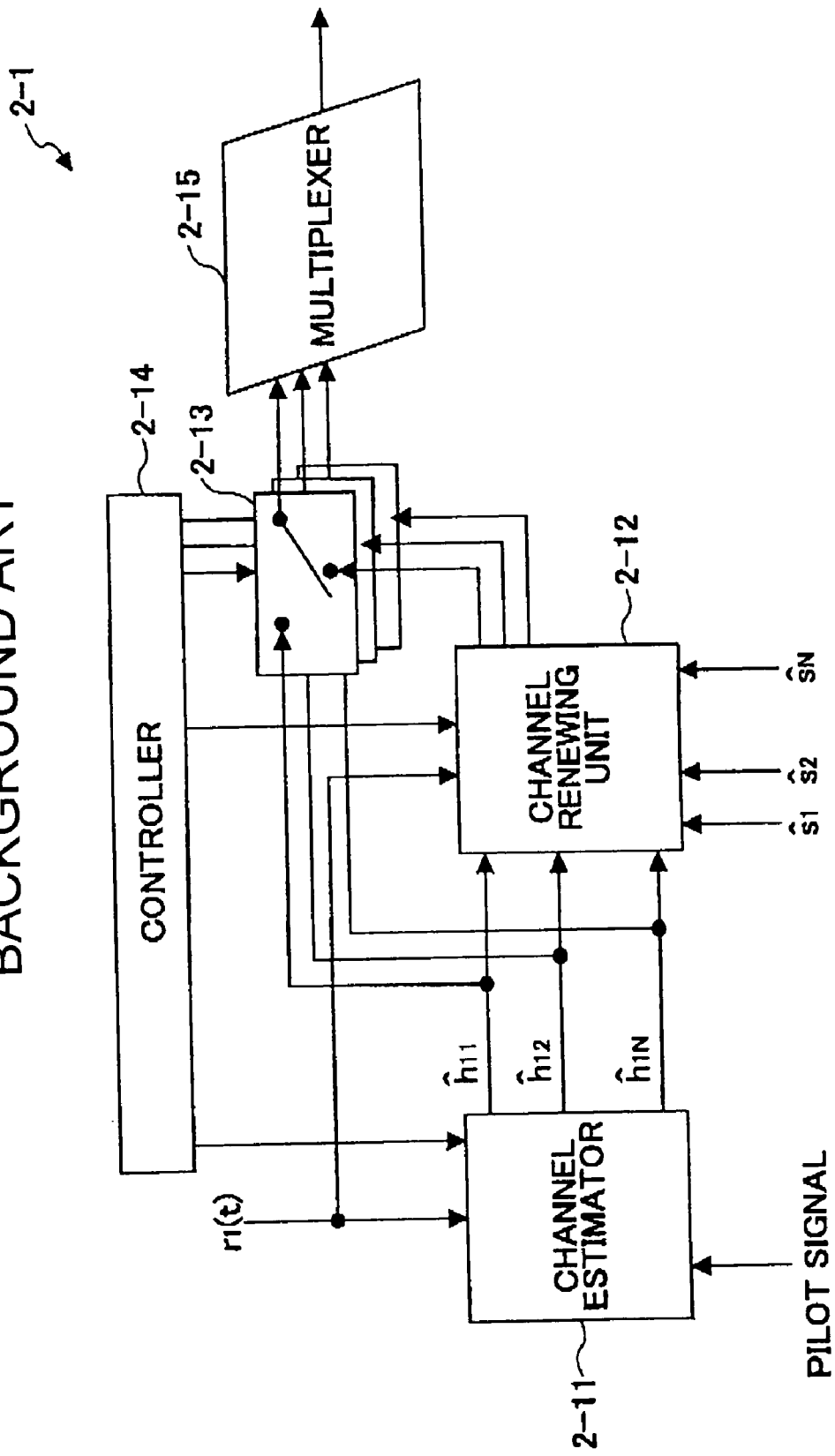
FIG. 3 schematically shows a block diagram of a channel estimator.
Figure 4:
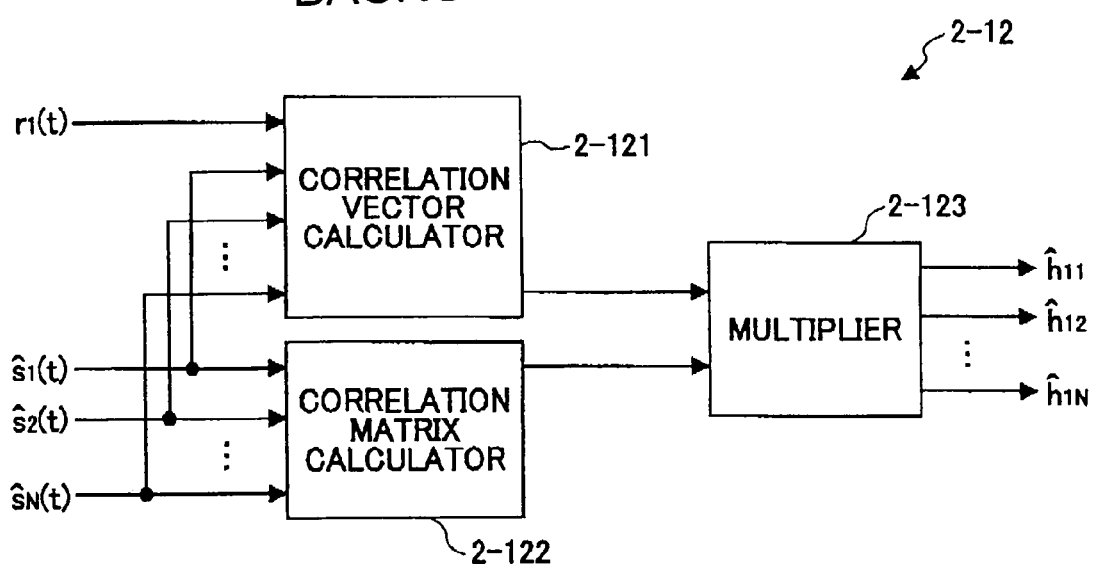
FIG. 4 schematically shows a block diagram of a channel updating unit.

The following is a description of embodiments of the present invention, with reference to the accompanying drawings.

Throughout all the figures, members and parts having the same or similar functions are assigned the same or similar reference numerals or symbols, and redundant explanations are omitted.

Figure 5:
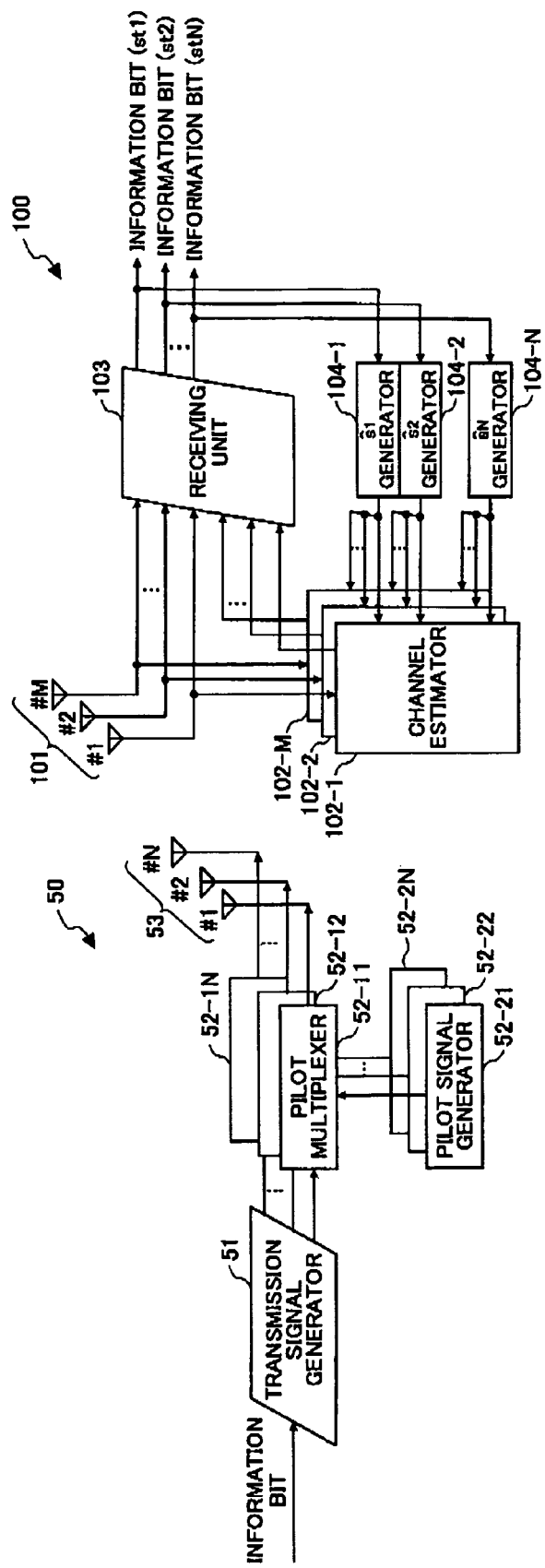
FIG. 5 schematically shows a block diagram of a radio communication system according to an embodiment of the present invention.

A radio communication system according to an embodiment of the present invention employs a multi-input multi-output (MIMO) system. As shown in FIG. 5, this radio communication system comprises a transmitter 50 and a receiver 100. The transmitter 50 has a plurality of transmit antennas #1~#N, each of which simultaneously transmits different information data streams using the same frequency. In this embodiment, the number of the transmit antennas equals to the number transmission streams, but the number of the antennas may be different from the number of the transmission streams. The receiver 100 has a plurality of reception antennas #1~#M, each of which receives all the information data streams transmitted from the transmitter 50. The receiver 100 processes the received signal, estimates transmission symbols sent from the transmitter 50, and outputs information bits st1~stN.

Now the transmitter 50 according to this embodiment of the present invention is explained.

The transmitter 50 according this embodiment comprises a transmission signal generator 51 for receiving information bits, a plurality of pilot multiplexers 52-11~52-1N connected to the transmission signal generator 51, a plurality of pilot signal generators 52-21~52-2N each connected to one of the pilot multiplexers respectively, and a plurality of antennas 53.

The transmission signal generator 51, based on the received information bits, generates N streams of transmission signals, each of which is input to one of the pilot multiplexers 52-11~52-1N. Each of the pilot signal generators 52-21~52-2N generates a pilot signal, which is input to a corresponding pilot multiplexer 52-11~52-1N. Each of the pilot multiplexers 52-11~52-1N multiplexes and transmits the input pilot signals and the transmission signals.

Next, the receiver 100 according to the embodiment of the present invention is explained.

In repeatedly estimating a channel, the receiver 100 according to this embodiment of the present invention cancels a reception signal replica of some highly reliable streams only, and suppresses other streams using a linear filter such as an MMSE filter.

The receiver 100 according to this embodiment of the present invention includes a plurality of antennas 101 #1~#M, a plurality of channel estimators 102-1~102-M each connected to one of the antennas respectively, a receiving unit 103 connected to channel estimators 102-1~102-M and antennas 101, and $s_1$ generator 104-1~$s_N$ generator 104-N each connected to the channel estimators 102-1~102-M.

First, after each antenna 101 receives the signals, its corresponding channel estimator 102 uses the received signals and pilot signals included therein, estimates channels, and supplies channel estimation values to the receiving unit 103.

The receiving unit 103 uses the input channel estimation values and received signals to detect information signals, and outputs the detected information signals such as information bits (st1, st2, ..., stN). These information bits (st1, st2, ..., stN) are input to the corresponding $s_1$ generator 104-1~$s_N$ generator 104-N.

Each of the $s_1$ generator 104-1, ..., the $s_N$ generator 104-N generates a transmission estimation value $s_1, ..., s_N$ based on a corresponding input information bit respectively, and outputs the generated transmission estimation value to the channel estimators 102-1~102-M.

In the succeeding estimation process, each of the channel estimators 102-1, ..., 102-M uses the estimated transmit symbols $s_1$~$s_N$ instead of the pilot signals, to estimate a channel more accurately. The channel estimators 102-1~102-M, the receiving unit 103 and $s_1$ generator 104-1~$s_N$ generator 104-N are controlled by a controller (not shown).

The structure of the channel estimators 102 (102-1~102-M) of the above mentioned receiver 100 is explained with reference to FIG. 6.

The channel estimator 102 includes a replica canceller 111 receiving a signal rm(t), a selector 118 connected to the replica canceller 111 and receiving a selection control signal, and a received signal replica rm1 generator 112-1~rmN generator 112-N each connected to the selector 118 and receiving a provisional channel estimation value hm1~hmN and an estimated transmit symbol $s_1(t)$~$s_N(t)$, respectively. The channel estimator 102 further includes a plurality of filters 113-1~113-N each connected to the replica canceller 111 and each of the rm1 generator 112-1 the rmN generator 112-N.

The filter 113-1 is taken as one example representing all the filters 113-1~113-N. The filter 113-1 includes an adder 113-11 connected to the replica canceller 111, a selector 113-12 connected to the rm1 generator 112-1 and the adder 113-11 and receiving the selection control signal, a second selector 113-13 receiving the selection control signal and the $s_1(t)$~$s_N(t)$, a correlation vector calculator 113-14 connected to the adder 113-11 and the second selector 113-13, a correlation matrix calculator 113-15 connected to the second selector 113-13, a multiplier 113-16 connected to the correlation vector calculator 113-14 and the correlation matrix calculator 113-15, and a third selector 113-17 connected to the multiplier 113-16.

In the channel estimator 102 of the receiver 100 according to this embodiment of the present invention, before the received signal rm(t) is input to the filter 113 (113-1~113-N), the replica canceller 111 cancels the received signal replica corresponding to a part of stream signals from the received signal rm(t).

In canceling the received signal replica from the received signal rm(t), only the received signal replica corresponding to a part of stream signals is subtracted, and other stream signals are suppressed by the liner filter 113. In this case, each stream is input to the filter 113 stream by stream. In the filter 113, a filter coefficient is different from stream to stream, and therefore a channel updating unit comprising the correlation vector calculator 113-14, the correlation matrix calculator 113-15 and the multiplier 113-16 is provided to establish a filter coefficient per stream.

In the channel estimator 102 according to this embodiment of the present invention, each of the rm1 generator 112-1~the rmN generator 112-N generates a received signal replica rm1~rmN, and inputs the generated received signal replica rm1~rmN to the selector 118 and the selector 113-12 in the corresponding filter 113 (113-1~113-N). The estimated transmit symbols $s_1(t)$~$s_N(t)$ are input to the second selector 113-13.

The selector 118 selects only the stream to be cancelled. The selector 113-12 inputs the received signal replica to the adder 113-11 when the stream signal for channel estimation is cancelled, and input null symbols to the adder when the stream signal for channel estimation is not cancelled. The second selector 113-13, from the input estimated transmit symbols $s_1(t)$~$s_N(t)$, selects the stream signal for channel estimation and the stream to be not-cancelled.

The stream to be cancelled may be a stream in which no error is detected in CRC (Cyclic Redundancy Check) determination process, or a stream whose signal strength is over predetermined threshold. In the above selection, using information regarding the reliability of each symbol obtained in error correction decoding process, the selection can be conducted symbol by symbol.

Information such as the CRC determination information can be input as selection control information to the selector 118, the selector 113-12 and the second selector 113-13.

The operation of the channel estimator 102 is now concretely explained.

The streams selected by the selector 118 as streams to be cancelled are represented by x1, x2, ..., xC. The signal output r'm(t) from the replica canceller 111 after cancellation is represented by Equation (1):

Equation (1)

$$r'_m(t) = r_m(t) - \sum_{n' = x_1 x_2 \ldots x_C} r'_{mn}(t) \qquad (1)$$

$$r_{mn}'(t) = \hat{h}_{mn}'' s_{n'}(t)$$

The output signal of the replica canceller 111 is input to the adder 113-11. A case is explained where in the selector 113-12, a stream for channel estimation represented by x is cancelled on the replica canceller 111, and streams which are not selected as streams to be cancelled are represented by y1, y2, ..., yC.

The selector 113-12 inputs the signal rmx(t) selected as streams for channel estimation to the adder 113-11 where the stream signal for channel estimation is cancelled. The adder 113-11 adds the cancelled signal to its own signal.

$$r'mx(t) = r'm(t) + rmx(t).$$

The output signal of the adder 113-11 is a signal that is the received signal with the received signal replica subtracted of at least a part of streams other than the streams to which channel estimation is performed.

Supposing that $S(t)=[sx(t)\ sy1(t)\ \ldots\ syC(t)]^T$, wherein T means transpose of a matrix, the correlation vector calculator 113-14 calculates a correlation vector Rxd by an equation, $Rxd=\Sigma(r'^*mx(t)S(t))/Nsmp$. * means complex conjugate. And the correlation matrix calculator 113-15 calculates a correlation matrix Rxx that is a filter coefficient by an equation, $Rxx=\Sigma(S(t)S(t)^H)/Nsmp$.

H means Hermitian conjugate.

An output signal of the correlation vector calculator 113-14 and an output signal of the correlation matrix calculator 113-15 are input to the multiplier 113-16. The multiplier 113-16 uses the correlation vector and the correlation matrix to perform multiplication of $Rxx^{-1}Rxd$. As a result, an output H from the multiplier 113-16 becomes Hm=[hx hy1 ... hyC], and this output signal is input to the third selector 113-17. The third selector 113-17 selects and outputs the hx. Instead of selecting hx by the third selector, it is possible to omit an operation for obtaining hy1~hyC in the multiplier 2-123.

As for streams which are not selected as a stream to be cancelled, $S(t)=[sy1(t)\ sy2(t)\ \ldots\ syc(t)]$ is the same for streams y1~yC, a correlation vector and correlation matrix can be calculated to collectively obtain channel estimations for these streams, Hm=[hy1 hy2 ... hyc]. These output signals are input to the third selector 113-17. The third selector 113-17 selects and outputs desired stream channel estimation.

As clear from the above equations, the channel estimations of the unselected streams can be collectively calculated and therefore the amount of calculations can be reduced. The flexibility of the filter can be used not for suppressing other streams but for strengthening streams for which channel estimation is performed. Further, by not removing a received signal in which an error has been found, but removing by filters, it becomes possible to increase channel estimation accuracy. The estimation values of the transmission symbols are used in this embodiment. However, these can be weighted with the reliabilities of the information bits constituting each symbol that is obtained in the error correction decoding process. In this case, the filter generating methods are described in patent document #1 and non-patent document #1.

When updating the channels using the information symbols, the channel estimation values obtained using the pilot signals can be averaged or averaged with weighted (with the best values such as the number of pilot symbols, the number of information symbols, function such as SNR, etc.) to obtain finally updated channel estimation values.

Next, a radio communication system according to a second embodiment of the present invention is explained.

The radio communication system according to the second embodiment is the same as that illustrated in FIG. 5 and therefore its explanation is omitted.

Figure 7:
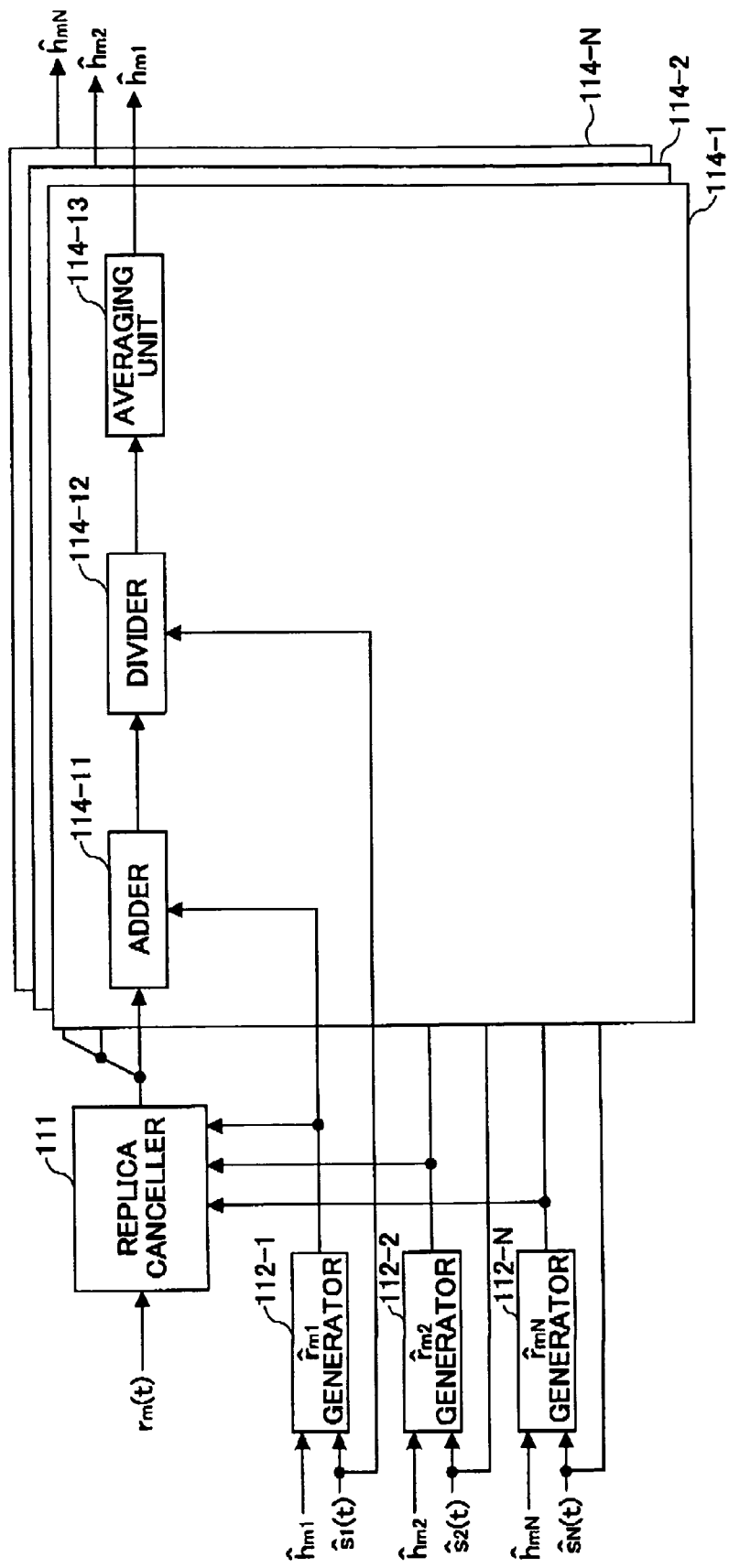
FIG. 7 schematically shows a block diagram of a channel estimator according to a second embodiment of the present invention.

A structure of a channel estimator 102 (102-1~102-M) of a receiver 100 according the second embodiment of the present invention is explained with reference to FIG. 7.

The channel estimator 102 includes a replica canceller 111 receiving a signal rm(t), and a received signal replica rm1 generator 112-1~rmN generator 112-N each connected to the replica canceller 111 and receiving a provisional channel estimation value hm1~hmN and an estimated transmit symbol $s_1(t)$~$s_N(t)$, respectively. The channel estimator 102 further includes a plurality of filters 114-1~114-N each connected to the replica canceller 111 and each of the rm1 generator 112-1 the rmN generator 112-N.

The filter 114-1 is explained as one example representing all the filters 114-1~114-N. The filter 114-1 includes an adder 114-11 connected to the replica canceller 111 and rm1 generator 112-1, a divider 114-12 connected to the adder 114-11 and receiving $s_1(t)$, and an averaging unit 114-13 connected to the divider 114-12.

In the channel estimator 102 according to this embodiment of the present invention, each of the rm1 generator 112-1~the rmN generator 112-N uses its corresponding (provisional) channel estimation value hm1~hmN and the transmission signal (symbol) estimation value $s_1(t)$~$s_N(t)$ and generates a received signal replica, and inputs the generated received signal replica to the replica canceller 111.

Next, the replica canceller 111 subtracts all received signal replicas from the received signal rm(t). The received signal from which the received signal replicas have been subtracted is input by the replica canceller 111 to a respective filter 114-1~114-N which are prepared per each stream.

The operation of the filter 114-1 is explained as one example representing all the filters 114-1~114-N.

The adder 114-11 adds the received signal replicas of the channel estimation target streams to the received signal from which the received signal replica has been subtracted. The received signal obtained by this addition becomes a signal that all streams other than the channel estimation target streams are subtracted from.

$$r'_{mn} = r_m - \sum_{n \neq n} r_{mn} \quad (2)$$

In the divider 114-12, this signal is divided by its corresponding training symbol. As a result, a channel estimation value can be obtained. The obtained channel estimation value is input to the averaging unit 114-12. The averaging unit 114-13 averages the input plural channel estimation values. In this manner, a higher accurate channel estimation value can be obtained, and it is possible to omit generation of a filter where streams other than the channel estimation target streams are suppressed in the received signal.

A radio communication system according to the third embodiment of the present invention is explained with reference to FIG. 8.

Figure 8:
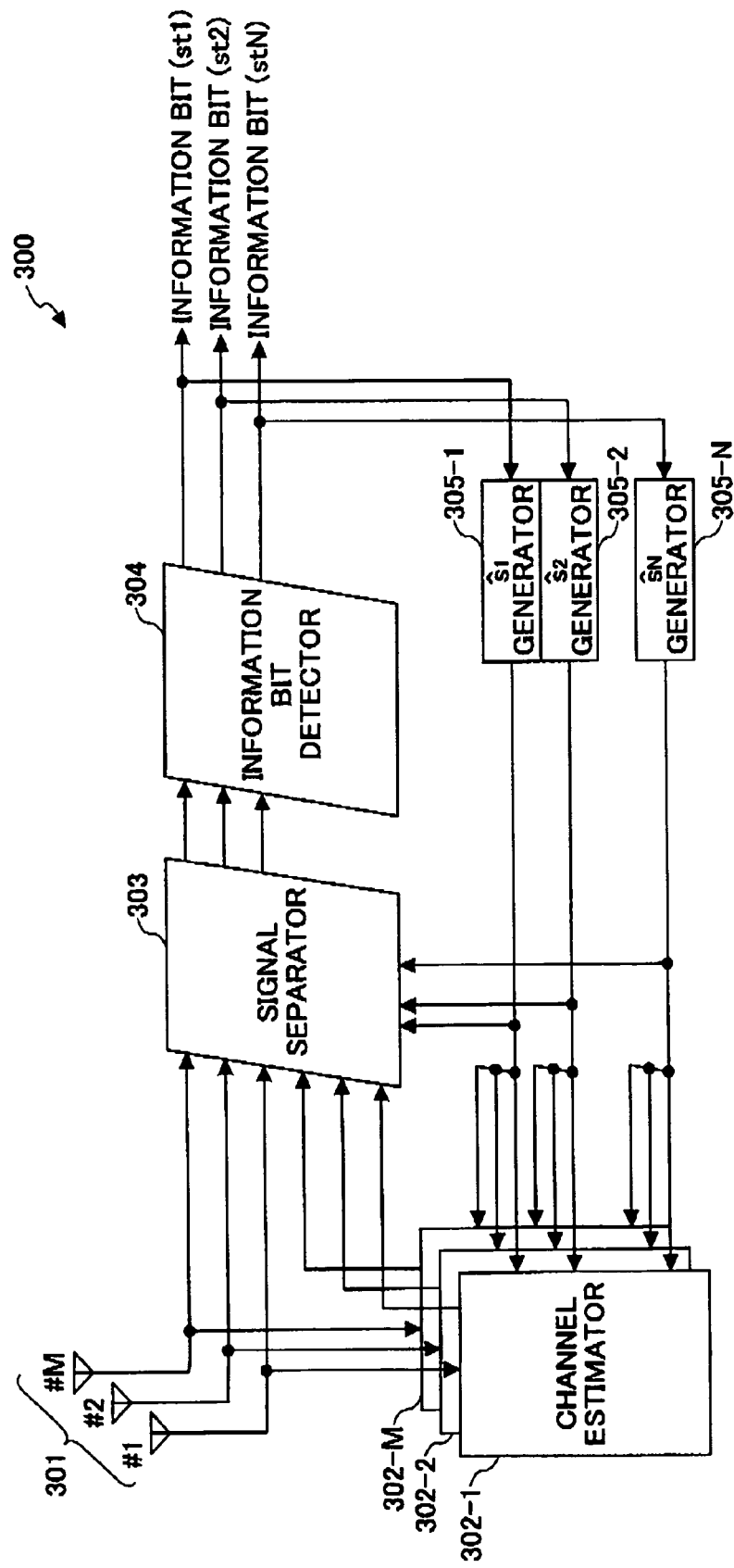
FIG. 8 schematically shows a block diagram of a receiver according to a third embodiment of the present invention.

The radio communication system according to this embodiment comprises the transmitter 50 explained above with reference to FIG. 5 and a receiver 300 illustrated in FIG. 8.

The receiver 300 is explained. In the receiver 300 according to this embodiment, the above described channel estimator 102 is applied to a turbo equalizing receiver.

The receiver 300 according to this embodiment comprises a plurality of antennas 301 (#1~#M), a plurality of channel estimators 302-1~302-M each connected to the corresponding antenna #1~#M, a signal separator 303 connected to each of the antennas 301, an information bit detector 304 connected to the signal separator 303, and $s_1$ generator 305-1~$s_N$ generator 305-N connected to the corresponding channel estimators 302-1~302-N. Output signals from the $s_1$ generator 305-1~the $s_N$ generator 305-N are input to the signal separator 303 also.

In operation, the channel estimators 302 (302-1~302-M), based on the received signal and the pilot signal input to each channel estimator 301-1~302-M, perform channel estimation, and supply the channel estimation values to the signal separator 303. The signal separator (equalizer) 303 separates the streams, and supplies its outputs to the information bit detector 304. The information bit detector 304 performs de-mapping/decoding processes on the separated signal. As a result, provisional received signals are obtained (information bits st1, . . . , stN). The thus obtained information bits st1, . . . , stN are input to corresponding $s_1$ generator 305-1, . . . , $s_N$ generator 305-N. Each of the $s_1$ generator 305-1, . . . , $s_N$ generator 305-N generates an estimated transmit symbol $s_1, . . . , s_N$ from the input information bit, and inputs the generated estimated transmit symbol to the corresponding channel estimator 302-1~302-M. The generated transmission estimation values $s_1, . . . , s_N$ are input to the signal separator 303.

Each channel estimator 302-1, . . . , 302-M uses the received transmission estimation values instead of pilot signals to estimate the channel, and inputs the channel estimation values to the signal separator 303.

The signal separator 303 uses the input estimated transmit symbols and the channel estimation values to separate the streams again. It is possible to previously obtain the reliabilities of the provisional detection bits and separate the streams on reliabilities.

As described above, the receiver 300 according to this embodiment estimates channels from the detected information bits by repeatedly equalizing and decoding, and utilizes the updated channel estimation values to perform the next equalizing process. In this manner, highly accurate channel estimation can be obtained.

Next, a radio communication system according to a fourth embodiment of the present invention is explained.

The structure of the radio communication system according to this embodiment is the same as that explained above with reference to FIG. 5, and its explanation is omitted.

A transmitter in the radio communication system according to this embodiment is explained below.

First a frame structure of frames sent by the transmitter is explained and then a structure of the transmitter is explained.

Figure 9:
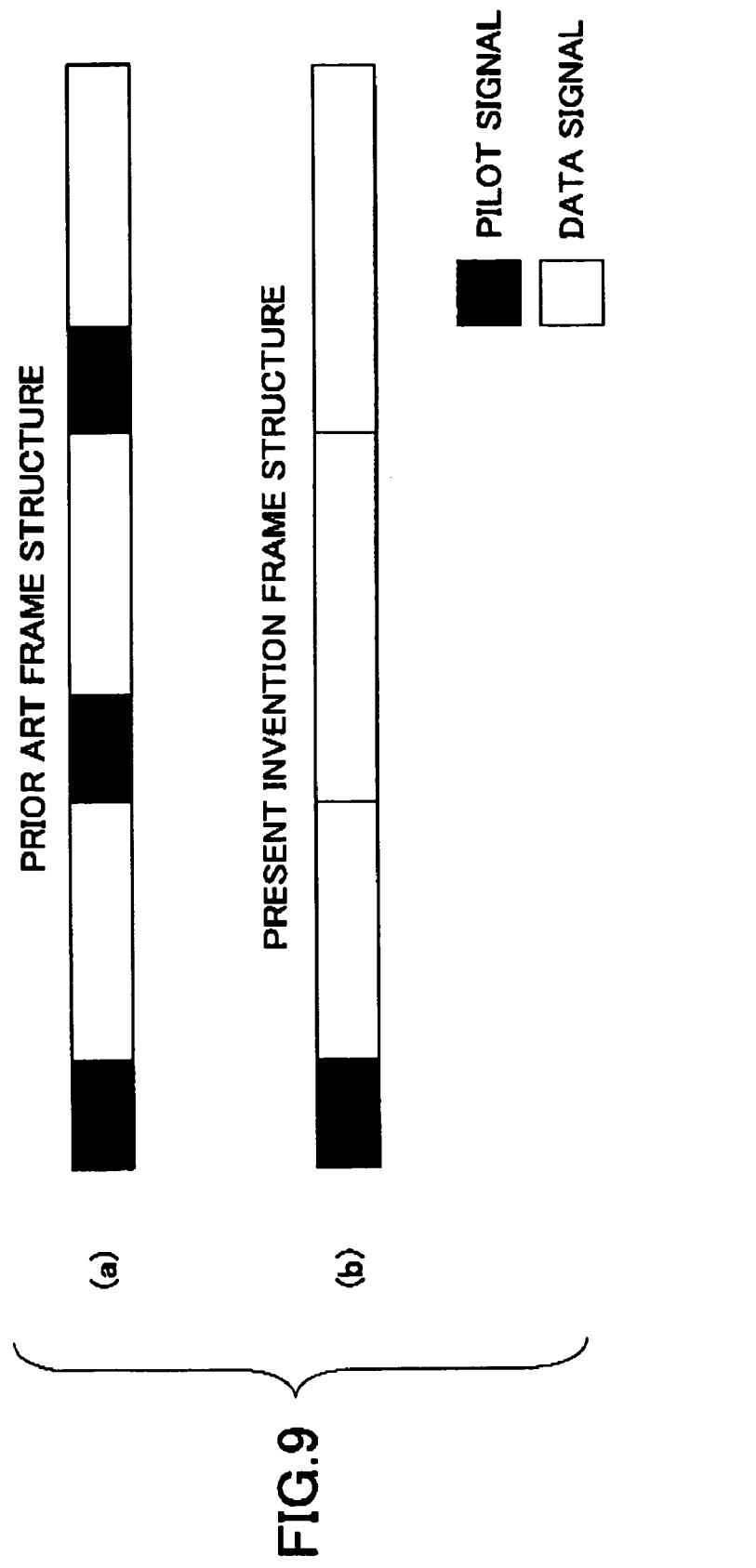
FIG. 9 illustrates frames sent by a radio communication system, (a) being frames in the prior art, (b) being frames in an embodiment of the present invention.

FIG. 9 shows a prior art frame structure and a frame structure according to this embodiment of the present invention.

In the prior art, even when one user occupies the frame continuously, pilot signals for channel estimation are inserted per frame because of channel variation, as shown in FIG. 9(a).

In this embodiment of the present invention, as shown in FIG. 9(b), a pilot signal is necessary in the leading frame, but no pilot signal for channel estimation is necessary in the second frame and after because that data signal in the preceding frame can be used to estimate the channel to continue communication.

Figure 10:
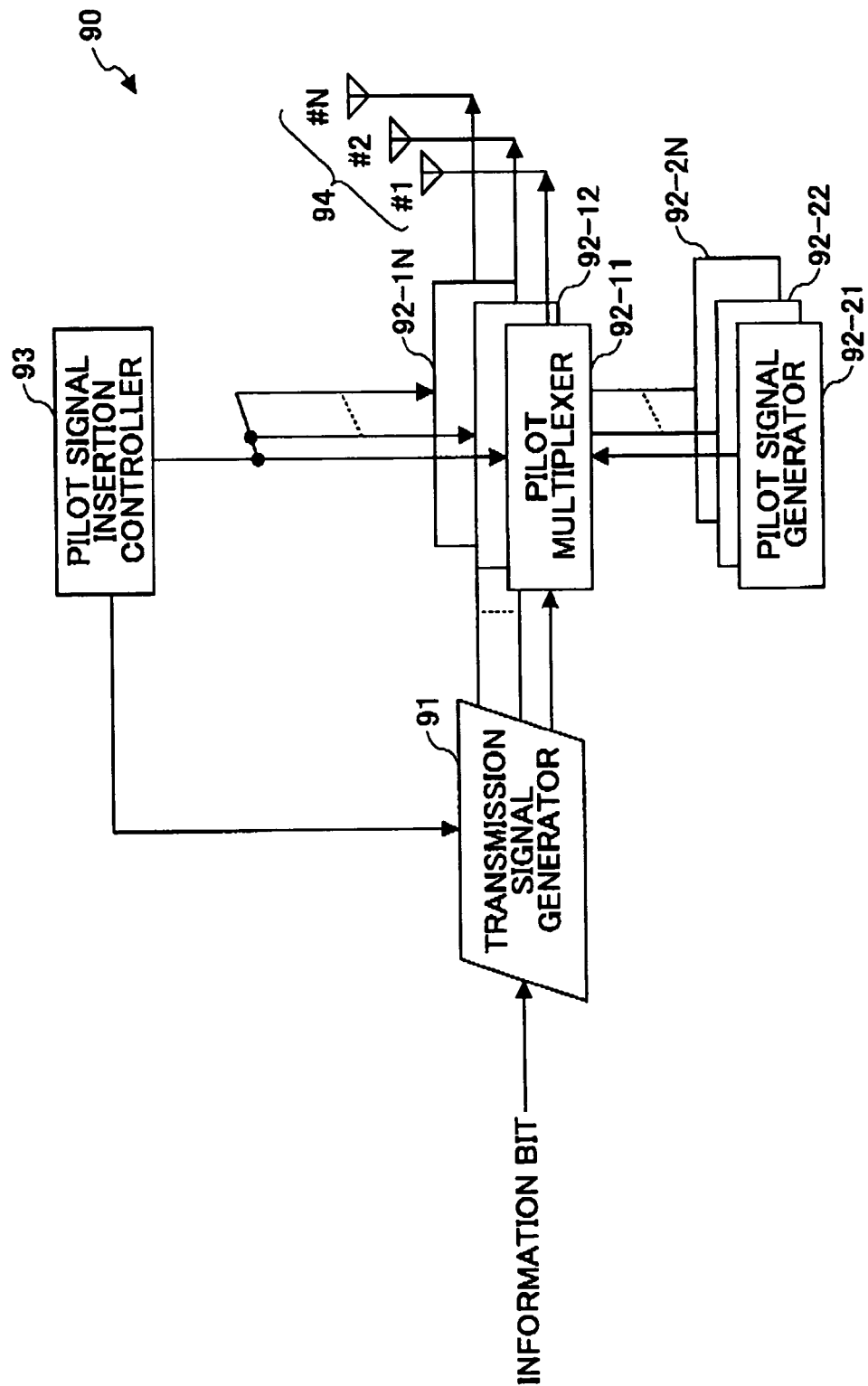
FIG. 10 schematically shows a block diagram of a transmitter according to a fourth embodiment of the present invention.

The transmitter 90 is explained with reference to FIG. 10.

The transmitter 90 can send the frames as shown in FIG. 9(b). The transmitter 90 comprises a transmission signal generator 91 for receiving information bits, a plurality of pilot multiplexers 92-11~92-1N connected to the transmission signal generator 91, a pilot signal insertion controller 93 connected to the transmission signal generator 91 and the pilot multiplexers 92-11~92-1N, a plurality of pilot signal generators 92-21~92-2N each connected to a corresponding pilot multiplexer 92-11~92-1N, and a plurality of antennas (#1~#N).

In the frames sent by the transmitter 90 according to this embodiment of the present invention, the leading frame and the succeeding frames contain different numbers of information symbols. Then, in the transmitter 90, the insertion of the pilot signal is controlled and the numbers of information symbols contained in frames are also controlled.

The operation of the transmitter 90 is explained.

The transmission signal generator 91, based on the received information bits, generates transmission signals, and inputs the generated transmission signals to each of the pilot multiplexers 92-11~92-1N. The pilot signal insertion controller 93 determines whether a pilot signal is necessary. Depending on the determination in the pilot signal insertion controller 93, each pilot signal generator 92-21~92-2N generates a pilot signal and inputs the generated pilot signal to a corresponding pilot multiplexer 92-11~92-1N. Each pilot multiplexer 92-11~92-1N multiplexes the input pilot signal and information symbols, and transmits them. Meanwhile, the pilot signal insertion controller 93 sends instructions to change block sizes of an error correction coding process and interleave sizes in an error correction coding process to the transmission signal generator 91.

The receiver 300 performs processing similar to that in the transmitter 90. That is, based on control signals, the information bit detector 304 changes the number of information symbols to be detected. The channel estimators according to this embodiment can be applied to a turbo equalizer receiver.

In this manner, the amount of actually transmittable information can be increased.

A radio communication system according to the fifth embodiment of the present invention is explained.

A structure of the radio communication system according to this embodiment is the same as that explained above with reference to FIG. 5, and its explanation is omitted.

In the receiver 100 according to this embodiment, each of the above explained channel estimators 102 (102-1~102-M) estimates and updates (or renews) channel estimation values (hm1, hm2, hmN). The updated channel estimation values (hm1, hm2, . . . , hmN) are used as provisional channel estimation values and are input to the channel estimators 102 (102-1~102-M). The channel estimators 102 perform channel estimation again.

In this manner, more precise channel estimation values can be obtained and channel estimation accuracy can be improved.

The above described repetition is not only done twice but also may be done more than twice. The number of repetitions can be previously obtained as a function of the number of received signals and SNR (signal-to-noise ratio) to get the necessary channel estimation accuracy.

Figure 11:
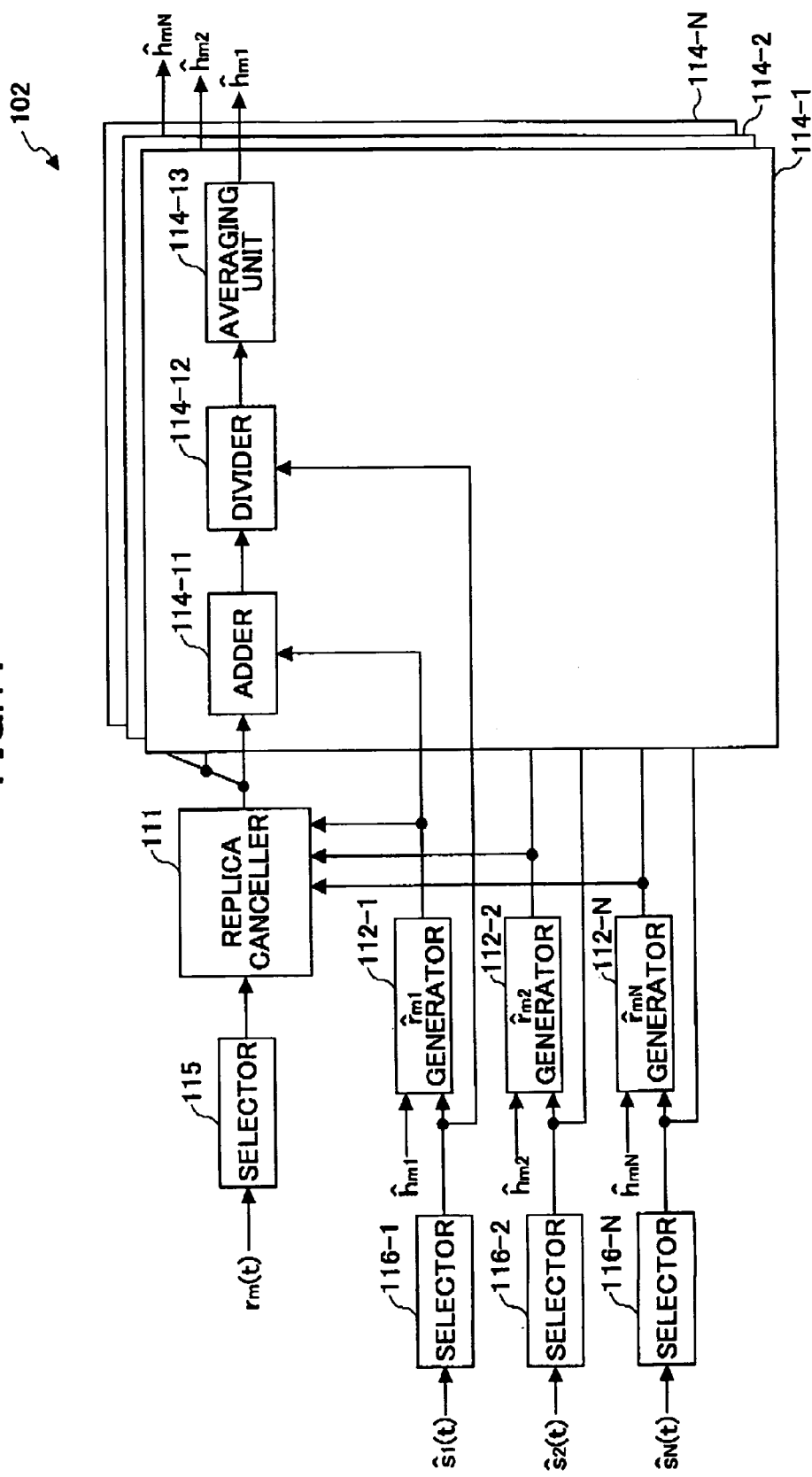
FIG. 11 schematically shows a block diagram of a channel estimator according to a sixth embodiment of the present invention.

A radio communication system according to a sixth embodiment of the present invention is explained with reference to FIG. 11.

The structure of the radio communication system according to this embodiment is the same as that explained above with reference to FIG. 5, and its explanation is omitted.

In the above explained embodiments, the received signals contained in all the frames are used to estimate channels. In this embodiment, however, the receiver uses a part of the received signals to estimate channels.

The channel estimator 102 of the receiver 100 according to this embodiment includes a selector 115 receiving a received signal rm(t), a replica canceller 111 connected to the selector 115, selectors 116-1~116-N 8 receiving corresponding estimated transmit symbols $s_1(t)$~$s_N(t)$, and transmission replica rm1 generator 112-1~transmission replica rmN generator 112-N. Each of the transmission replica generators 112-1~112-N receives a corresponding provisional channel estimation value hm1~hmn, is connected to the corresponding selector 116-1~116-N, and is also connected to the replica canceller 111. The channel estimator 102 further comprises a plurality of filter 114-1~114-N each connected to the replica canceller 111 and the corresponding rm1 generator 112-1~rmN generator 112-N.

The filter 114-1 is explained as one example representing all the filters 114-1~114-N. The filter 114-1 includes an adder 114-11 connected to the replica canceller 111 and rm1 generator 112-1, a divider 114-12 connected to the selector 116-1 and the adder 114-11, and an averaging unit 114-13 connected to the divider 114-12.

The channel receiving unit 102 of the receiver 100 according to this embodiment has the selectors 115, 116-1~116-N selecting the received signals and the transmission signals respectively, in addition to the channel estimators explained above with reference to FIG. 7.

Figure 12:
FIG. 12 illustrates frame structure according to an embodiment of the present invention.

For example, in cases where transmission is continuous and a previous frame is used in the next frame to estimate channels as in the above embodiments, it is better to perform channel estimation for the received signal at the rear end of a frame as shown in FIG. 12, because the channel varies with time. In this situation, the selectors 115, 116-1~116-N select the received signals at the rear end of the frames.

Figure 13:
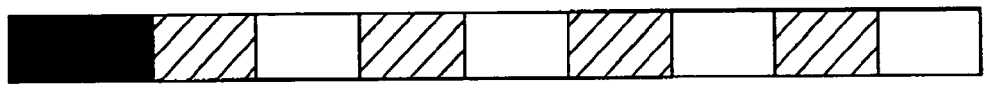
FIG. 13 illustrates frame structure according to an embodiment of the present invention.

On the other hand, when applied to the turbo equalizer, etc., it is desired to select information symbols from the whole frame for estimating channels and use averaged channel estimation values. In this situation, the selectors 115, 116-1~116-N select a part from the whole frame as shown in FIG. 13.

When estimating channels by using a part of received signals, it is necessary to determine the number of received signals to be used. The number of received signals to be used can be a certain fixed number or can be previously determined based on SNR.

In this manner, channel estimation accuracy can be improved, and it is possible to avoid channel estimation processing more than necessary.

A radio communication system according to a seventh embodiment of the present invention is explained.

A structure of the radio communication system according to this embodiment is similar to that explained with reference to FIG. 5, and its explanation is omitted.

Figure 14:
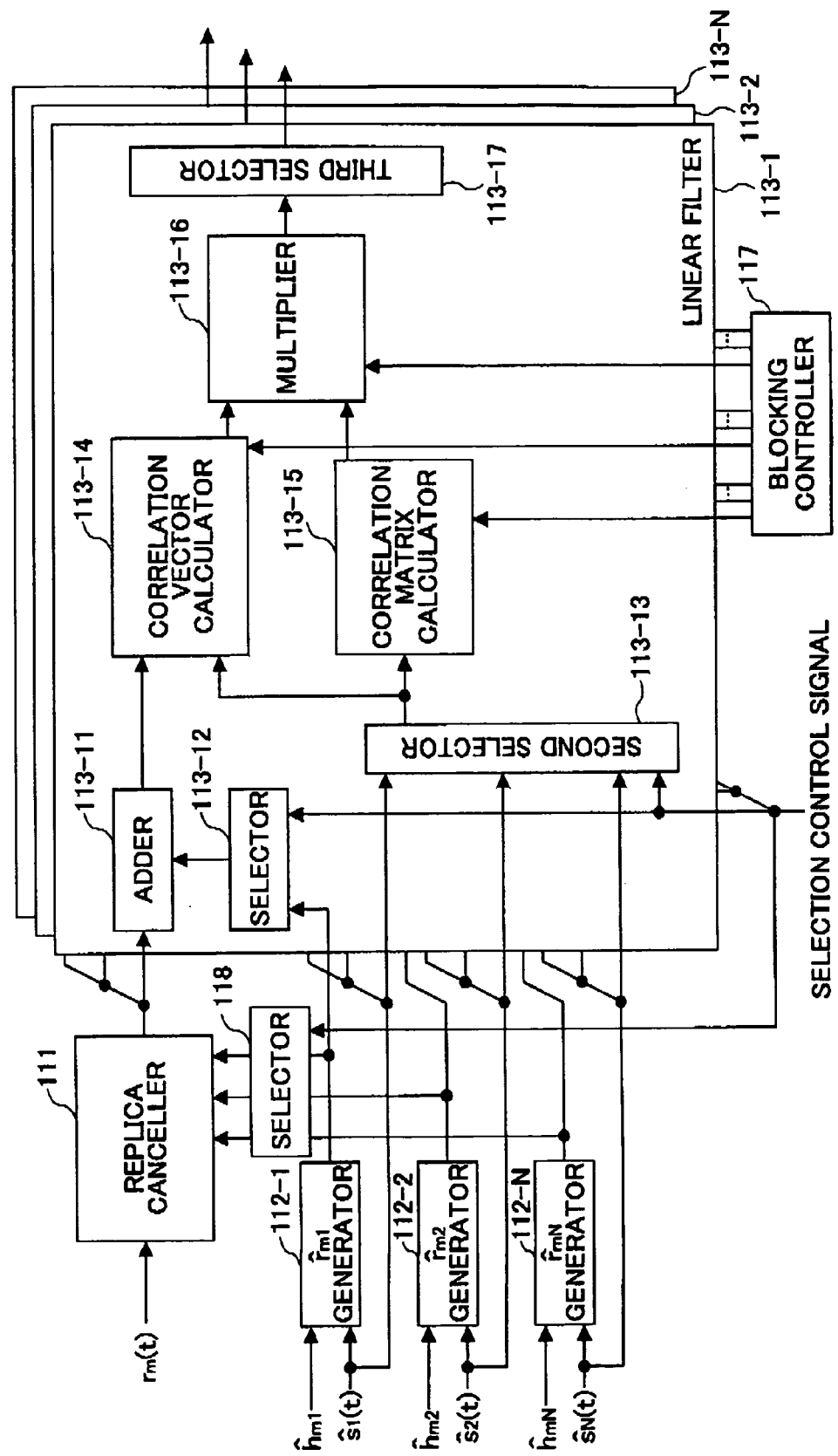
FIG. 14 schematically shows a block diagram of a channel estimator according to a seventh embodiment of the present invention.

As shown in FIG. 14, the channel estimator 102 of the receiver 100 according to this embodiment comprises a correlation vector calculator 113-14, a correlation matrix calculator 113-15 and a multiplier 113-16 in each liner filter 113-

Figure 6:
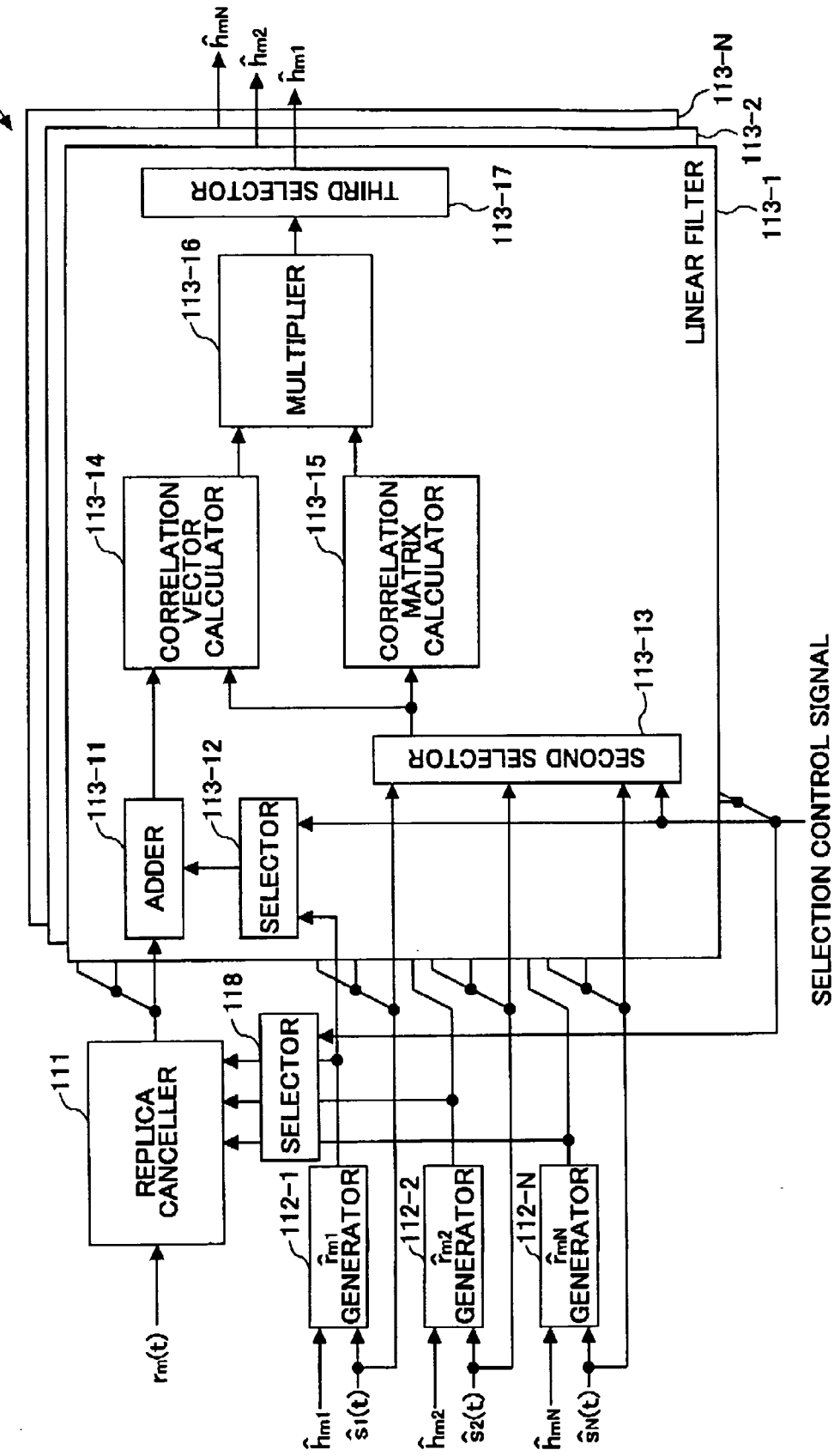
FIG. 6 schematically shows a block diagram of a channel estimator according to a first embodiment of the present invention.

1~113-N, in addition to the elements in the channel estimator shown in FIG. 6. The channel estimator 102 further comprises a blocking controller 117.

In this embodiment, the blocking controller 117 divides a frame into some blocks, and channels are estimated block by block. When separating each block signal, or equalizing each block, channel estimation values obtained when equalizing each block are used.

Figure 15:
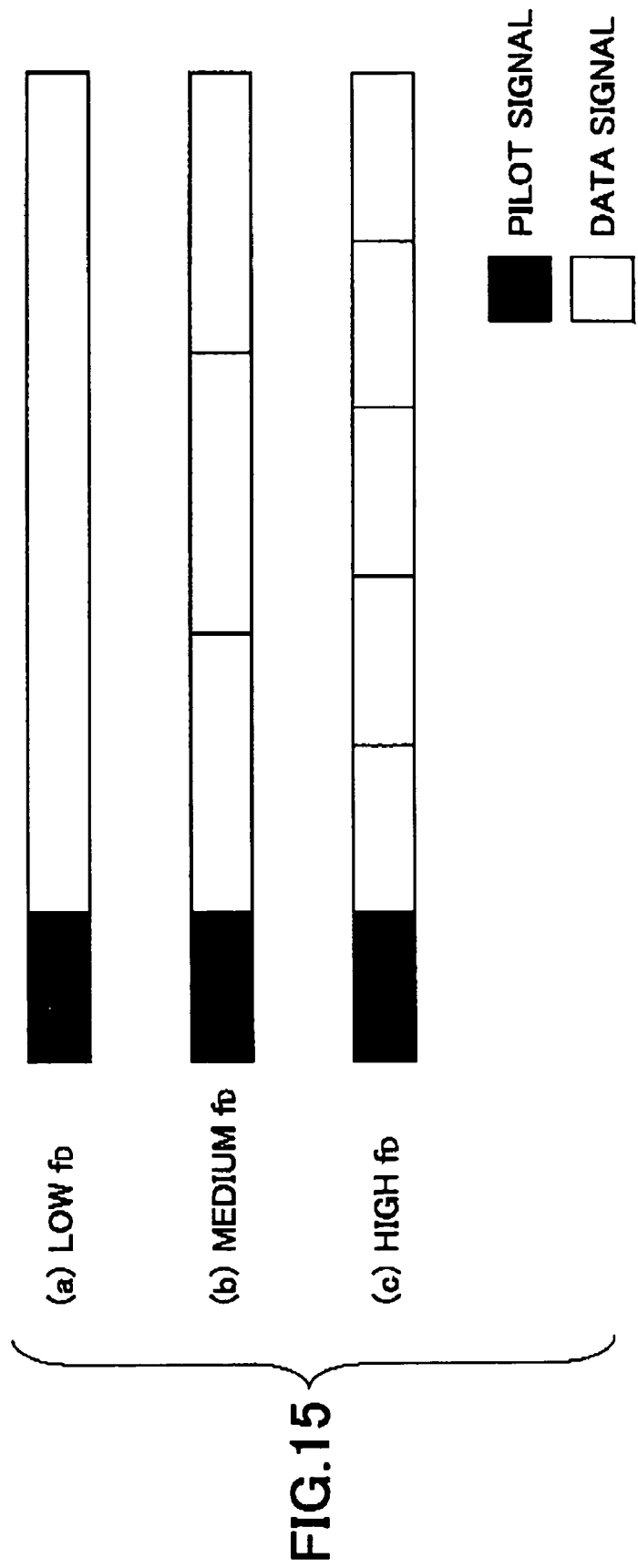
FIG. 15 illustrates frames sent by a radio communication system according to an embodiment of the present invention, (a) showing low channel variation, (b) showing medium channel variation and (c) showing high channel variation.

The size of the block can be a previously determined size. Alternatively, the block size can be adaptively varied depending on channel variation. In this case, as the channels vary faster, the blocks should be divided into smaller pieces. For example, as shown in FIG. 15, as the channels vary higher, the block size should be smaller as shown in FIG. 15(a) to FIG. 15(c). In FIG. 15, fD means channel variation speed. Channel estimation values in each block can be obtained by weight averaging the channel estimation values of peripheral blocks. In this way, even when the channels vary, channel estimation accuracy is improved.

Alternatively, the channel estimator 102 can be provided with a plurality of blocking controllers 117 for each liner filter 113-1~113-N, each of which is connected a corresponding correlation vector calculator 113-14, correlation matrix calculator 113-15 and multiplier 113-16.

In the radio communication system according to this embodiment, interference from any other streams than the channel estimation target stream are previously cancelled or reduced and therefore the amount of calculation is decreased and channel estimation accuracy is improved.

By canceling any other streams than the channel estimation target stream, MMSE filter calculation can be omitted to reduce the amount of calculation.

For example, in a case where N (=4) streams and Sym (=10) data symbols are used for estimating channels, comparison is made regarding the number of division/multiplication calculation for one receiving antenna, as follows.

An amount of calculation in the prior art is $2 \times N2 \times Sym + N3 + N2 = 400.$ An amount of calculation in the embodiments of the present invention is $2 \times N \times Sym + N - 84.$ Therefore it is clearly understood that an amount of calculation can be reduce to ⅕ according to the embodiments of the present invention.

INDUSTRIAL APPLICABILITY

A radio communication system according to the embodiments of the present invention can be applied to MIMO (Multiple Input Multiple Output) receivers, MIMO transmitters and MIMO radio communication systems and their channel estimation methods.

The present application is based on Japanese Priority Application No. 2004-122163 filed on Apr. 16, 2004 with the Japanese Patent Office, the entire contents of which are hereby incorporated by reference.

What is claimed is:

1. A receiver in a radio communication system transmitting MIMO channel signals, comprising:
a plurality of received signal replica generators configured to generate received signal replicas based on previously obtained provisional channel estimation values and transmission signal estimation values;
a single canceller configured to remove, from a received signal, the received signal replicas of at least a part of streams which streams are not channel estimation target streams;
a single first selector connected to the canceller and configured to receive a selection control signal; and
a plurality of channel estimation value generators configured to generate channel estimation values by a filter using outputs from the canceller and the transmission signal estimation values, each of the plurality of channel estimation value generators internally including an adder connected to the canceller, and a second selector connected to a corresponding received signal replica generator and the adder, each of the second selectors configured to receive the selection control signal,
wherein the received signal replica generators, the first selector and the canceller are external to each of the plurality of channel estimation value generators.

2. The receiver as claimed in claim 1, wherein each of the plurality of channel estimation value generators determine filter coefficients to reduce interference from streams that have not been cancelled in the canceller.

3. The receiver as claimed in claim 1, wherein the each of the plurality of channel estimation value generators input the updated channel estimation values to the plurality of received signal replica generators as the provisional channel estimation values.

4. The receiver as claimed in claim 1, further comprising:
a blocking unit configured to divide a frame into plural blocks;
an equalizing unit configured to separate the received signal into each stream;
the plurality of channel estimation value generators each configured to obtain a channel estimation value per block;
the equalizing unit, based on the channel estimation value obtained per block, configured to separate the received signal into each stream.

5. The receiver as claimed in claim 4, wherein the plurality of channel estimation value generators determine a size of the block based on channel variation speed.

6. The receiver as claimed in claim 1, wherein
the plurality of received signal replica generators generate the received signal replicas based on at least a part of the transmission signal estimation values; and
the canceller removes, from at least a part of the received signals, the received signal replicas of at least the part of the streams that are not channel estimation target streams.

* * * * *